United States Patent
Chen (10) Patent No.: US 8,393,349 B2
(45) Date of Patent: Mar. 12, 2013

(54) TIRE AIR VALVE WITH PRESSURE INDICATOR

(76) Inventor: Kuo Shiung Chen, Tainan (TW)

(*) Notice: Subject to any disclaimer, the term of this patent is extended or adjusted under 35 U.S.C. 154(b) by 185 days.

(21) Appl. No.: 13/102,058

(22) Filed: May 6, 2011

(65) Prior Publication Data

US 2012/0279582 A1 Nov. 8, 2012

(51) Int. Cl.
*F16K 15/20* (2006.01)

(52) U.S. Cl. ....... 137/227; 137/232; 137/557; 73/146.8; 116/34 R (58) Field of Classification Search .................. 137/226, 137/227, 232, 614.11, 557, 559; 73/146.2, 73/146.8; 116/34 R, 34 A, 34 B; 152/427
See application file for complete search history.

(56) References Cited

U.S. PATENT DOCUMENTS

| | | | | |
|---|---|---|---|---|
| 1,162,668 A * | 11/1915 | Van Ness | ................... | 116/34 B |
| 1,236,411 A * | 8/1917 | Downs | ..................... | 116/34 R |
| 1,294,458 A * | 2/1919 | Hayward | ................... | 137/226 |
| 1,878,411 A * | 9/1932 | Gilbert | .................... | 116/34 R |
| 2,167,456 A * | 7/1939 | Hooper | .................... | 116/34 R |
| 3,451,418 A * | 6/1969 | Junichiro et al. | ............. | 137/227 |
| 3,572,283 A * | 3/1971 | Ashman | .................... | 116/34 R |
| 4,072,048 A * | 2/1978 | Arvan | ....................... | 73/146.8 |
| 4,193,295 A * | 3/1980 | Curran | ..................... | 73/146.8 |
| 5,886,254 A * | 3/1999 | Chi | .......................... | 73/146.8 |
| 6,247,513 B1 * | 6/2001 | Lukins | ..................... | 152/427 |
| 6,561,212 B1 * | 5/2003 | Hsu | ........................... | 137/227 |
| 6,615,651 B1 * | 9/2003 | Barbanti | ................... | 73/146.2 |
| 7,493,808 B2 * | 2/2009 | Milanovich et al. | ........ | 73/146.8 |

* cited by examiner

*Primary Examiner* — Craig Schneider
*Assistant Examiner* — Craig J Price (57) ABSTRACT

A tire air valve having the function of indicating tire pressure includes an air valve casing having an inner center post orderly installed thereon with a lower locking block, a first spring, an upper locking block and a second spring. A fixed member is secured on the upper locking block, and a cap is covered on the air valve casing and provided with an upper indicating member, a third spring, a lower indicating member and a locking ring. The upper indicating member has an outer wall formed into a low pressure region and a warning region, while the lower indicating member has an outer wall formed into a safety region. The upper and the lower locking block can completely seal up the air valve to prevent air from leaking, and a driver can judge whether tire pressure is normal by visual observation through the cap on the air valve casing.

3 Claims, 7 Drawing Sheets

TIRE AIR VALVE WITH PRESSURE INDICATOR

BACKGROUND OF THE INVENTION

1. Field of the Invention

This invention relates to a tire air valve having a function of indicating tire pressure, particularly to the one whose cap at upper end of the tire air valve can be determined whether the condition of tire pressure is normal or not by visual sight, able to insure safety of driving a car.

2. Description of the Prior Art

Generally, for the sake of safety, before starting a journey, an automobile ought to be inspected in many aspects, inclusive of the volume of gasoline, the condition of water tank, the brake system, the lights, tire pressure and so on. In order to keep the tire pressure in a normal condition is extremely important to insure safety of driving a car, however, most drivers inspect the tire pressure of all tires in a way of visual observation, that is, whether the tire pressure is sufficient or not is judged by visual sight about the extent of deformation of a tire. In fact, the way of visual observation is not possible to precisely judge whether the tire pressure is normal or inflating the tire is needed forthwith. Therefore, accurate inspection of tire pressure is necessary to be carried out in an automobile maintenance and repair shop or by providing a tire pressure detector, thus resulting in much inconvenience. In view of such a situation, various kinds of electronic tire pressure indicating apparatus have come into existence; nevertheless, such electronic tire pressure indicating apparatus are complicated in structure, high price, difficult assembly, and also easy to cause short circuit to disable operating of the apparatus normally and losing a warning function of tire pressure. Another conventional tire pressure as "AIR VALVE CAP HAVING FUNCTION OF INDICATING TIRE PRESSURE" is directly assembled on the upper side of a tire air valve to be pushed by the pressure in a tire. This conventional tire pressure indicating apparatus is composed of a main base, a thimble, a transparent section and an indicating member. A cap is locked on a tire air valve so that the pressure in a tire can be directly transmitted into the cap to push the indicating member, which matches with a transparent tube of the air valve cap and is divided into a red-colored region and a green-colored region. When the indicating member is located in the green-colored region, it means that the tire pressure is normal, and when the indicating member lies in the red-colored region, it means that the tire pressure is deficient, thus letting the cap serve as a detector and an indicator of tire pressure. However, if the cap of this conventional air valve, which is installed on the air valve and has function of indicating tire pressure, gets cracks or becomes damaged by bumping, air in the tire will leak out through the cracked portion from the cap and as a consequence, dangers may occur during driving in case the driver does not find the rupture of the cap and replace it with a new one on time.

SUMMARY OF THE INVENTION

The objective of this invention is to offer a tire air valve having the function of indicating tire pressure, which is provided with a cap at the upper end of the air valve, and a driver can determine as per visual sight through the cap whether the tire pressure is normal or not, able to insure safety of driving a car.

The tire air valve in the present invention includes an air valve casing formed therein with a stepped accommodating chamber having an inner wall provided with female threads. The air valve casing has an upper section of its inner wall formed with an upper obliquely-conical surface and a lower section formed with a lower obliquely-conical surface. A center post positioned in the stepped accommodating chamber of the air valve casing has an outer wall disposed with an obliquely-conical upper annular recess and an obliquely-conical lower annular recess, and its upper end set with a push block. Furthermore, the center post is formed with a flange on the wall at a location between the upper annular recess and the push block, and an obliquely-conical upper sealing ring is fitted on the upper annular recess and an obliquely-conical lower sealing ring is fitted on the lower annular recess of the center post. A lower locking block to be mounted around a lower section of the center post is provided with a stepped through hole having its lower section formed with an obliquely-conical surface for matching the lower sealing ring on the center post. The lower locking block has an outer wall disposed with an obliquely-conical annular recess fitted thereon with an obliquely-conical sealing ring, which matches the lower obliquely-conical surface of the air valve casing, and a first spring is fitted around the center post, having a lower end resisting against the upper end of the lower locking block. An upper locking block is mounted around an intermediate section of the center post, having a lower end pushing against the upper end of the first spring. The upper locking block is provided with a stepped through hole having a lower section formed with an obliquely-conical surface matching the upper sealing ring on the center post. The upper locking block further has an outer wall formed with an obliquely-conical annular recess fitted thereon with an obliquely-conical sealing ring that matches the upper obliquely-conical surface of the air valve casing. A second spring is fitted around the center post and has a lower end positioned in the stepped through hole of the upper locking block, with the lower end of the second spring resisting the upper locking block and the upper end pushing against the flange of the center post. A fixed member received in the stepped accommodating chamber of the air valve casing has an underside disposed with a recessed groove and its topside bored with an insert hole passing through the recessed groove. Further, the fixed member is provided with an air intake accommodating with the recessed groove and has an outer wall formed with male threads to be threadably locked with the female threads in the stepped accommodating chamber of the air valve casing. A cap made of transparent material and assembled on the air valve casing has an upper end formed into a transparent viewing window. The cap is provided in an interior with an accommodating chamber having its inner wall provided with female threads to be threadably locked with the male threads of the air valve casing, and its interior installed with an upper indicating member, a third spring and a lower indicating member. The upper indicating member is provided with a recessed groove for receiving the third spring, which has an upper end resisting the inner side of the recessed groove, having an upper portion of an outer wall formed into a low pressure region, and a lower portion of its outer wall formed into a warning region. The lower indicating member to be fitted around the outer side of the upper indicating member is provided with a recessed hollow for receiving both the upper indicating member and the third spring, which has a lower end pushing against the inner side of the recessed hollow. The lower indicating member has an upper edge formed with a flange and an outer wall formed into a safety region, having an underside resisting the push block of the center post. A locking ring to be fixed in the accommodating chamber of the cap is bored with a through hole for the lower indicating member to be inserted therein and has an outer wall provided with male threads to be threadably locked with the female threads of the cap.

BRIEF DESCRIPTION OF DRAWINGS

This invention will be better understood by referring to the accompanying drawings, wherein.

DETAILED DESCRIPTION OF THE PREFERRED EMBODIMENT

A preferred embodiment of a tire air valve having the function of indicating tire pressure in the present invention, as shown in FIGS. 1-4, includes an air valve casing 1, a center post 2, a lower locking block 3, an upper locking block 4, a fixed member 5, a cap 6 and a locking ring 7 as main components combined together.

The air valve casing 1 has an interior formed with a stepped accommodating chamber 10 having the inner wall near an upper portion provided with female threads 11, and an upper section of its outer wall provided with male threads 12. The stepped accommodating chamber 10 has an upper section of its inner wall formed with an upper obliquely-conical surface 13 and a lower section formed with a lower obliquely-conical surface 14.

The center post 2 to be fixed in the stepped accommodating chamber 10 of the air valve casing 1 has its outer wall provided with an obliquely-conical upper annular recess 20, an obliquely-conical lower annular recess 21, a push block 22 set at an upper end, a flange 23 formed on an outer wall at a location between the upper annular recess 20 and the push block 22. An obliquely-conical upper sealing ring 24 is fitted on the upper annular recess 20 and an obliquely-conical lower sealing ring 25 is fitted on the lower annular recess 21 of the center post 2.

The lower locking block 3 to be mounted on a lower section of the center post 2 is bored with a stepped through hole 30 having a lower section disposed with an obliquely-conical surface 300 for matching the lower sealing ring 25 of the center post 2, and has an outer wall formed with an engage recess 31 and an oblique-conical annular recess 32. A buffer washer 33 is to be engaged on the engage recess 31, and an obliquely-conical sealing ring 34 is fitted on the annular recess 32 for matching the lower obliquely-conical surface 14 of the air valve casing 1. A first spring 35 is fitted around the center post 2, having its lower end resisting against the upper end of the lower locking block 3.

The upper locking block 4 is mounted on an intermediate section of the center post 2, having its lower end pushing an upper end of the first spring 35, and its interior bored with a stepped through hole 40 having a lower section formed with an obliquely-conical surface 400 for matching the upper sealing ring 24 of the center post 2. The upper locking block 4 further has an outer wall provided with an obliquely-conical annular recess 41, and an obliquely-conical sealing ring 42 matching with the upper obliquely-conical surface 13 of the air valve casing 1 is fitted on the annular recess 41. A second spring 43 is fitted around the center post 2, having its lower end positioned in the stepped through hole 40 and resisting the upper locking block 4 and its upper end pushing against the flange 23 of the center post 2.

The fixed member 5 received in the stepped accommodating chamber 10 of the air valve casing 1 has its underside disposed with a recessed groove 50 and its upper side bored with an insert hole 51 passing through the recessed groove 50. Further, the fixed member 5 is provided with an air intake 52 communicating with the recessed groove 51 and has an outer wall formed with male threads 53 to engage with the female threads 11 inside the stepped accommodating chamber 10 of the air valve casing 1.

The cap 6 made of transparent material is assembled on the air valve casing 1 and has an upper portion formed into a transparent viewing window 60 and an interior disposed with an accommodating chamber 61 having an inner wall provided with female threads 62 to be threadably locked with the male threads 12 of the air valve casing 1. The accommodating chamber 61 is installed therein with an upper indicating member 63, a third spring 64 and a lower indicating member 65. The upper indicating member 63 is formed with a recessed groove 630 for receiving the third spring 64, which has an upper end resisting an inner side of the recessed groove 630. The upper indicating member 63 has an upper portion of its outer wall set to be a low pressure region 631 marked with yellow color, and a lower portion of its outer wall set to be a warning region 632 marked with red color. The lower indicating member 65 to be fitted around the outer side of the upper indicating member 63 is provided with a recessed hollow 650 for receiving the upper indicating member 63 and the third spring 64, which has a lower end resisting the inner side of the recessed hollow 650. The lower indicating member 65 further has its upper edge formed with a flange 651 and an outer wall set to be a safety region 652 marked with green color, having its underside pushing against the push block 22 of the center post 2.

The locking ring 7 to be received in the accommodating chamber 61 of the cap 6 is bored with a through hole 70 for the lower indicating member 65 to be inserted therein and has its outer wall provided with male threads 71 to be threadably locked with the female threads 62 of the cap 6.

Figure 1:
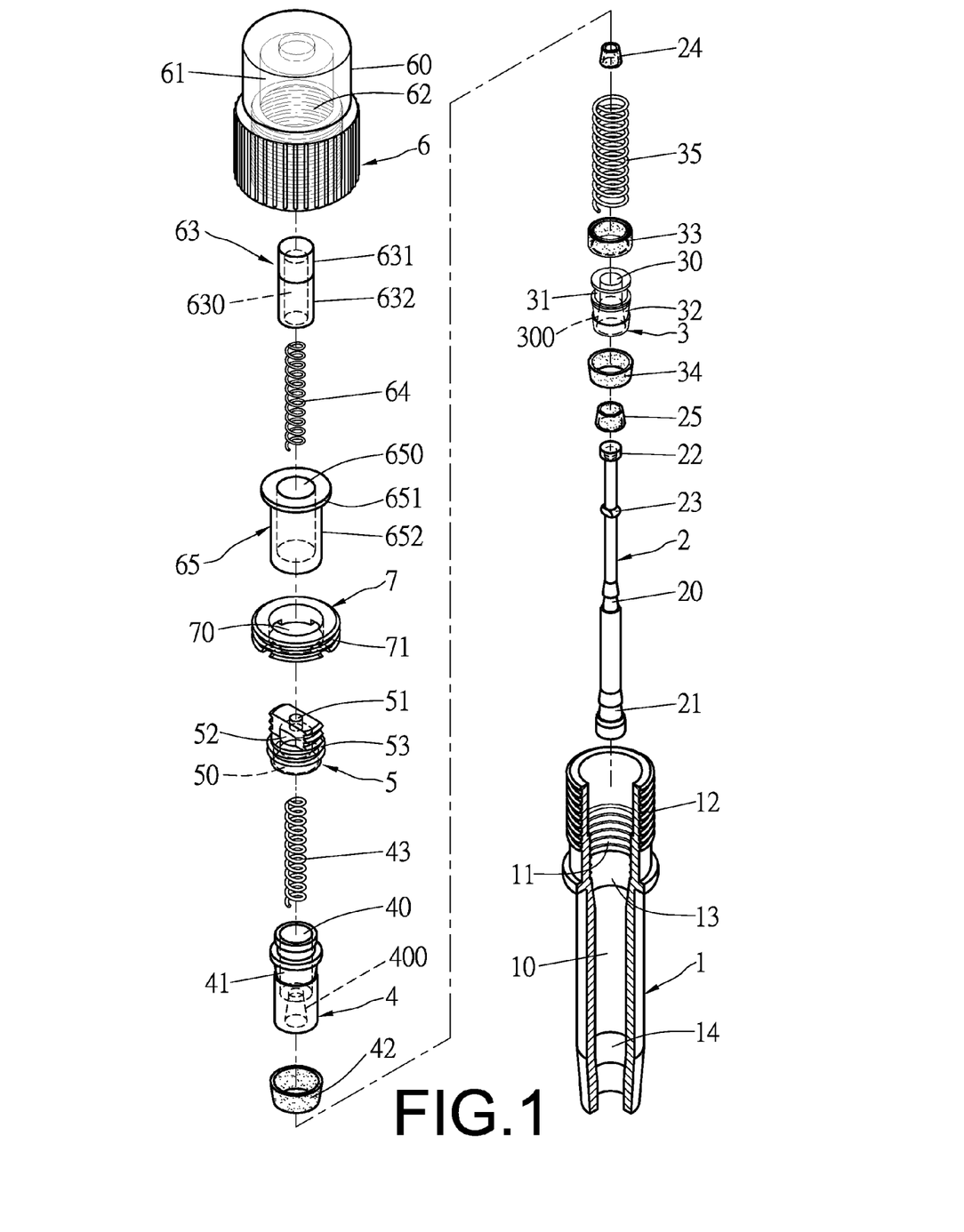
FIG. 1 is an exploded perspective view of a tire air valve having the function of indicating tire pressure in the present invention.
Figure 2:
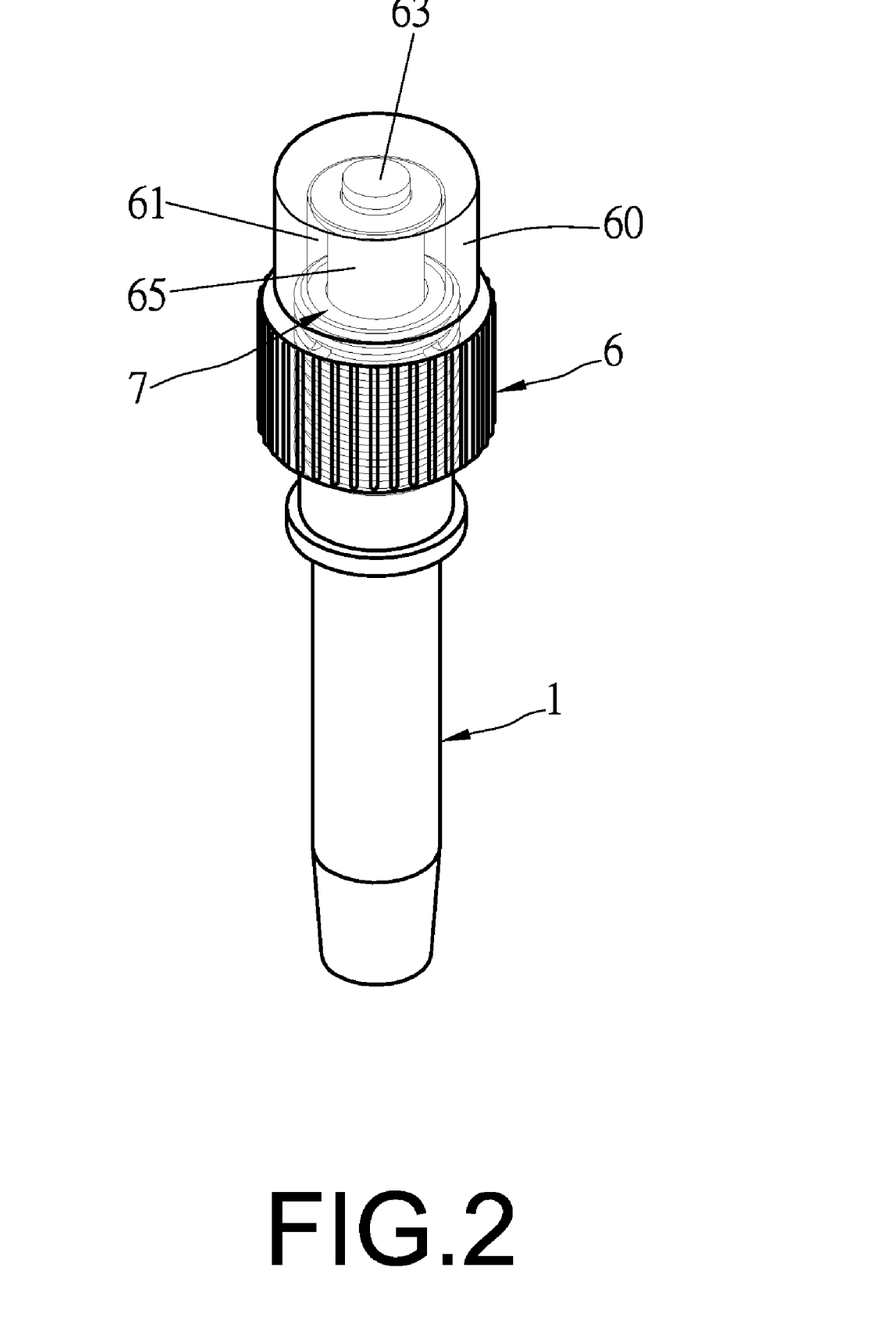
FIG. 2 is a perspective view of the tire air valve having the function of indicating tire pressure in the present invention.
Figure 3:
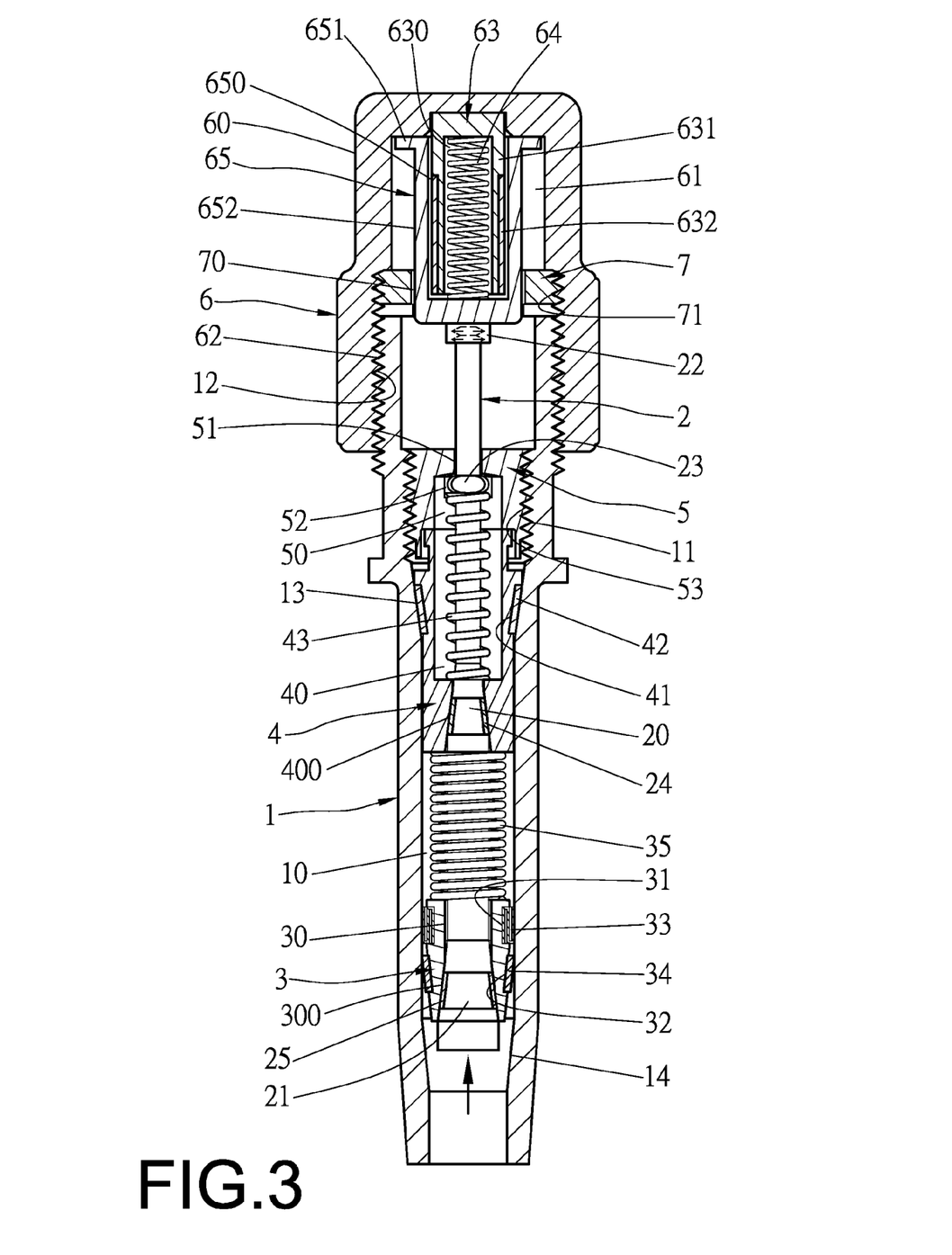
FIG. 3 is a cross-sectional view of the tire air valve having the function of indicating tire pressure in the present invention, illustrating that the tire pressure is at normal condition.

In assembling, referring to FIGS. 1 to 3, firstly, the lower sealing ring 25 is fitted on the lower annular recess 21 and the upper sealing ring 24 fitted on the upper annular recess 20 of the center post 2, and then the buffer washer 33 is engaged with the engage recess 31 and the sealing ring 34 is fitted on the annular recess 32 of the upper locking block 3. Next, the lower locking block 3 is mounted around a lower section of the center post 2, letting the lower sealing ring 25 at the lower section of the center post 2 stuck with the obliquely-conical surface 30 in the stepped through hole 30 of the lower locking block 3 to seal up the stepped through hole 30, and the first spring 35 is fitted around the center post 2 and the sealing ring 42 is mounted on the annular recess 41 of the upper locking block 4. Then, the upper locking block 4 is fitted on the intermediate section of the center post 2, letting the upper sealing ring 24 of the center post 2 stuck with the obliquely-conical surface 400 in the stepped through hole 40 of the upper locking block 4 to seal up the stepped through hole 40 and at this time, the second spring 43 has its lower end positioned in the stepped through hole 40 of the upper locking block 4 and its upper end resisting the underside of the flange 23 of the center post 2. After the upper end of the center post 2 is inserted through the insert hole 51 of the fixed member 5, the center post 2 and all the members assembled on the center post 2 are together received in the stepped accommodating chamber 10 of the tire air valve casing 1, and the male threads 53 of the fixed member 5 and the female threads 11 of the tire air valve casing 1 are threadably locked together to position the center post 2 in the interior of the air valve casing 1. At this time, the stepped accommodating chamber 10 of the air valve casing 1 will be sealed up by the sealing ring 34 and the buffer washer 33 on the outer wall of the lower locking block 3 and also by the sealing ring 42 on the outer wall of the upper locking block 4. Subsequently, the third spring 64 is positioned in the recessed groove 630 of the upper indicating member 63, and then the upper indicating member 63 and the third spring 64 are together received in the recessed hollow 650 of the lower indicating member 65. Afterward, the upper indicating member 63, the third spring 64 and the lower indicating member 65 are set in the accommodating chamber 61 of the cap 6, and the male threads 71 of the locking ring 7 and the female threads 62 in the accommodating chamber 61 of the cap 6 are threadably fixed together. Finally, the lower indicating member 65 has its lower end inserted through the through hole 70 of the locking ring 7, and the cap 6 has its female threads 62 threadably locked with the male threads 12 of the air valve casing 1 to have the underside of the lower indicating member 65 in the cap 6 resisting against the push block 22 at the upper end of the center post 2 in the air valve casing 1, thus finishing assembly of a whole tire air valve having the function of indicating tire pressure.

Figure 4:
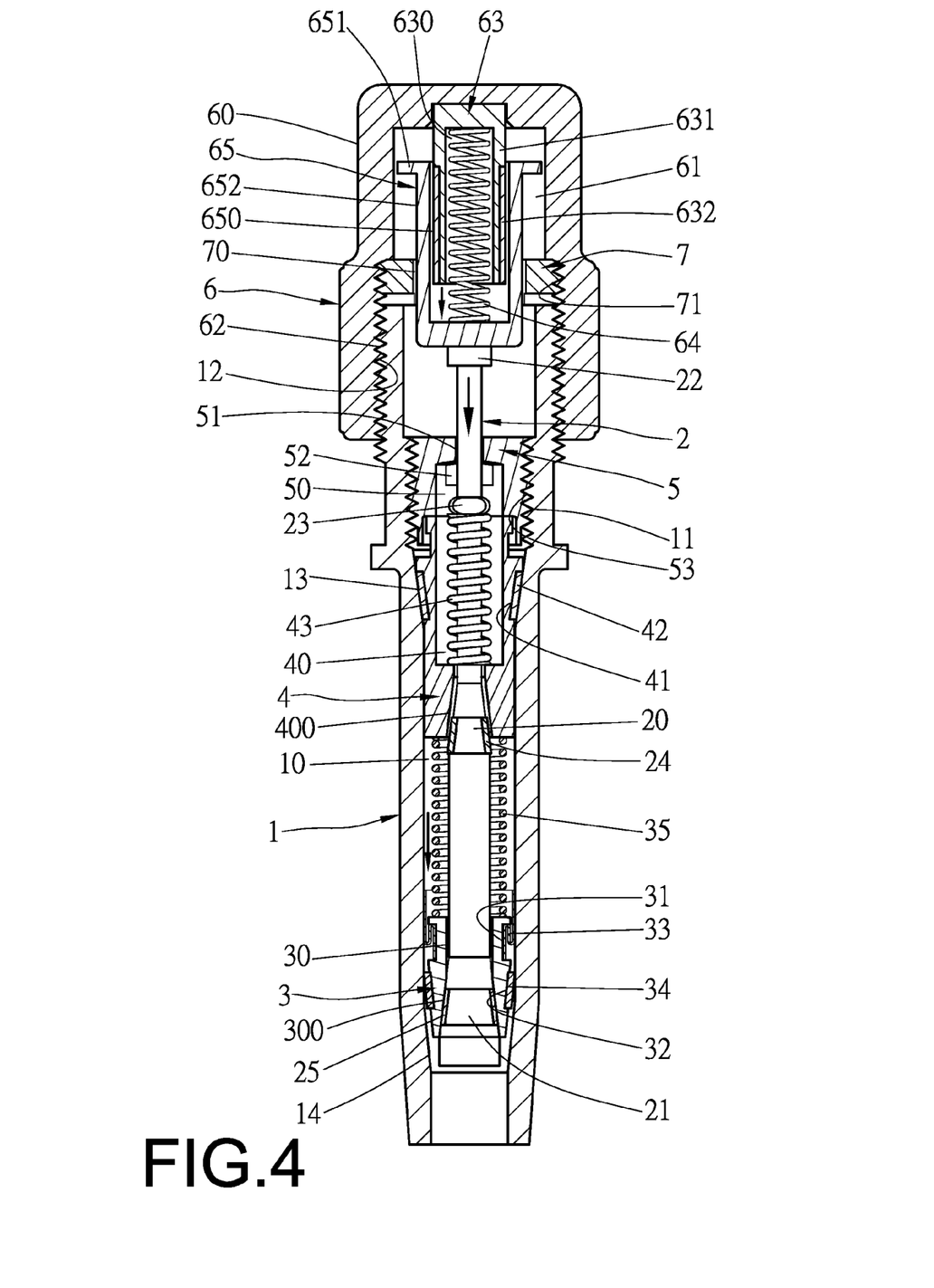
FIG. 4 is a cross-sectional view of the tire air valve having the function of indicating tire pressure in the present invention, illustrating that the tire pressure of a tire is at low condition.
Figure 5:
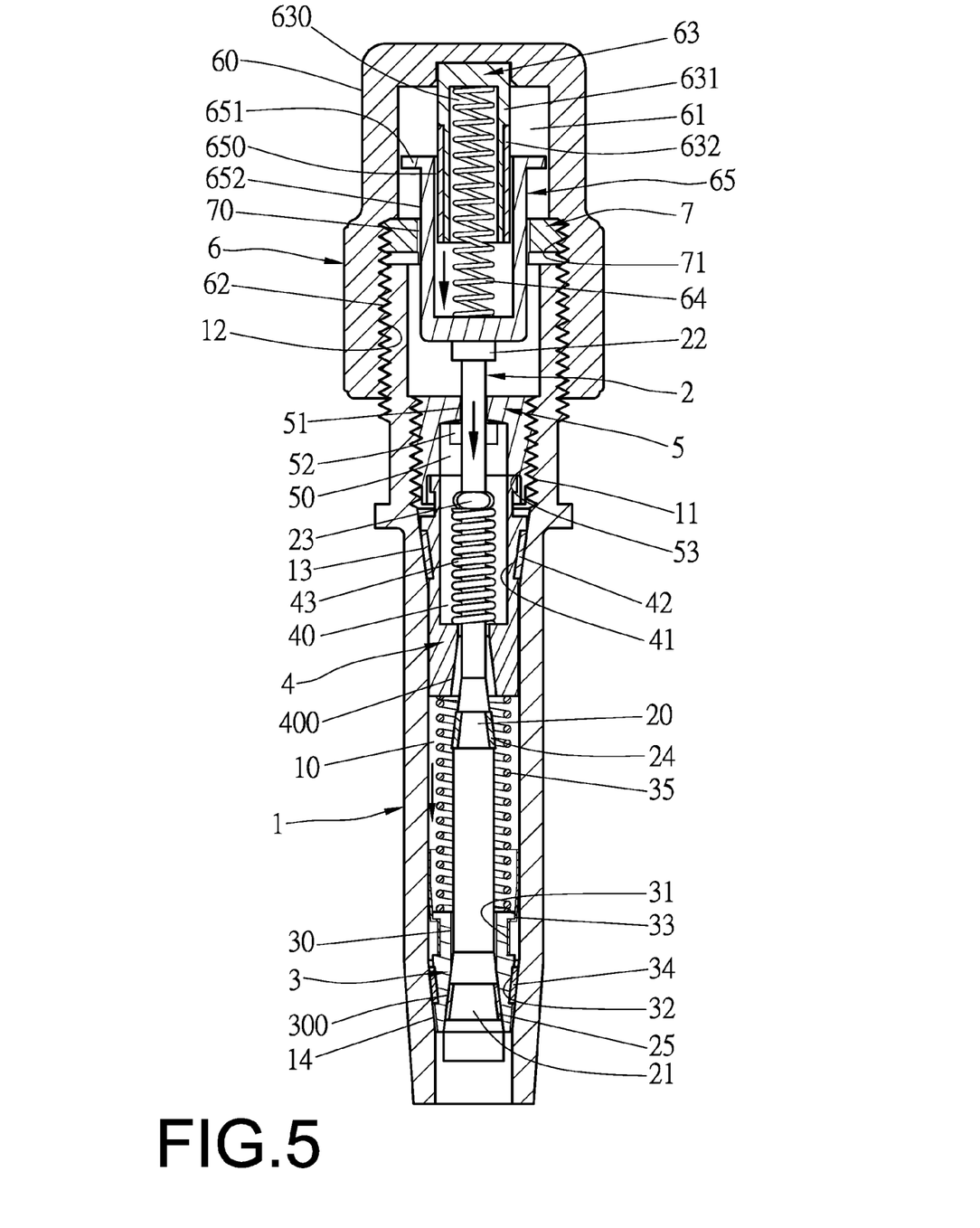
FIG. 5 is a cross-sectional view of the tire air valve having the function of indicating tire pressure in the present invention, illustrating that the tire pressure of a tire has dropped so low to a risky condition (or deficiency of the pressure)

In using, referring to FIGS. 3 to 5, after the tire air valve of this invention is installed on a tire of an automobile, the pressure in the tire will push upward the center post 2 inside the air valve casing 1, and simultaneously the push block 22 at the upper end of the center post 2 will push upward the lower indicating member 65 in the cap 6 to force the lower indicating member 65 compress the third spring 64 in the upper indicating member 63 so that the third spring 64 may be elastically compressed. When the tire pressure is at normal condition, (the normal tire pressure of a small-sized automobile is set to be 32 psi), the lower indicating member 65 will fully cover the upper indicating member 63, as shown in FIG. 3, and the green-colored safety region 652 of the lower indicating member 65 can be seen through the transparent viewing window 60 of the cap 6. Thus, observing through the transparent viewing window 60 of the cap 6, a user can understand that the tire pressure is at normal condition. When air inside of a tire slowly leaks out to cause the tire pressure being lower than the elasticity coefficient set by the third spring 64, the third spring 64 will slightly restore its resilience and push down the lower indicating member 65, letting the lower indicating member 65 shift downward a little, as shown in FIG. 4. At this time, the low pressure region 631 at the upper portion of the upper indicating member 63 will somewhat protrude out over the lower indicating member 65, and the yellow-colored low pressure region 631 of the upper indicating member 63 can be seen through the transparent viewing window 60 of the cap 6 so as to remind a driver to pay attention to the tire pressure any time and inflate the tire at the right time. When the tire pressure of a tire drops to a deficient condition, the lower indicating member 65 will be pushed by the third spring 64 to move downward slightly once again, as shown in FIG. 5, and at this time, the warning region 632 at a lower portion of the upper indicating member 63 will protrude out over the lower indicating member 65. Thus, the warning region 632 with a red-colored mark of the upper indicating member 63 can be seen through the transparent viewing window 60 of the cap 6 to let a driver know that the tire pressure is deficient and the tire must be inflated immediately. By so designing, a driver can understand the conditions of the tire pressure by the different colored regions presented on the transparent viewing window 60 of the cap 6 of the tire air valve and can timely inflate the tire for insuring safety of driving a car.

Specifically, the upper locking block 4 and the lower locking block 3 provided on the center post 2 in the air valve casing 1 of this invention can prevent air in a tire from leaking out through the air valve. When the center post 2 is moved downward, referring to FIGS. 4 and 5, the flange 23 of the center post 2 will push the second spring 43, which may become elastically compressed, and the upper sealing ring 24 of the center post 2 will be disengaged from the obliquely-conical surface 400 in the stepped through hole 40 of the upper locking block 4, but the first spring 35 will restore its resilience to push the lower locking block 3 to let the lower locking block 3 shift downward together with the center post 2, while the lower sealing ring 25 of the center post 2 will still seal up the stepped through hole 30 of the lower locking block 3. Thus, even if the tire pressure in a tire drops too low to let the cap 6 at the upper side of the air valve casing 1 broken, air in the tire still can be sealed up by the lower locking block 3, impossible to leak out. In addition, the buffer washer 33 set on the lower locking block 3 can function to slow down shift velocity of both the center post 2 and the lower locking block 3 for preventing the related members from being damaged to insure safety in use.

Figure 6:
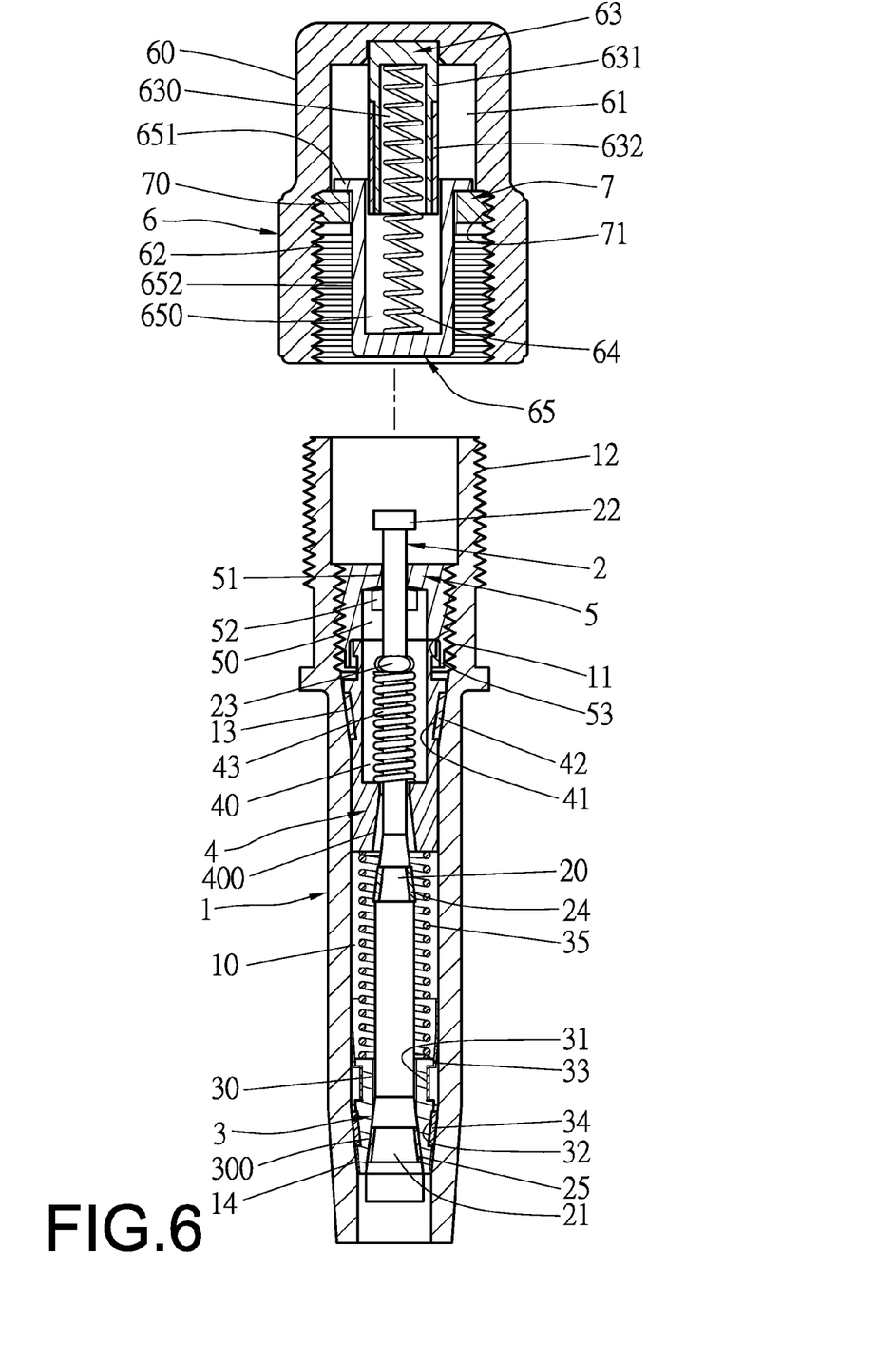
FIG. 6 is a cross-sectional view of the tire air valve having the function of indicating tire pressure in the present invention, illustrating that the cap of the tire air valve is removed before inflating the tire.
Figure 7:
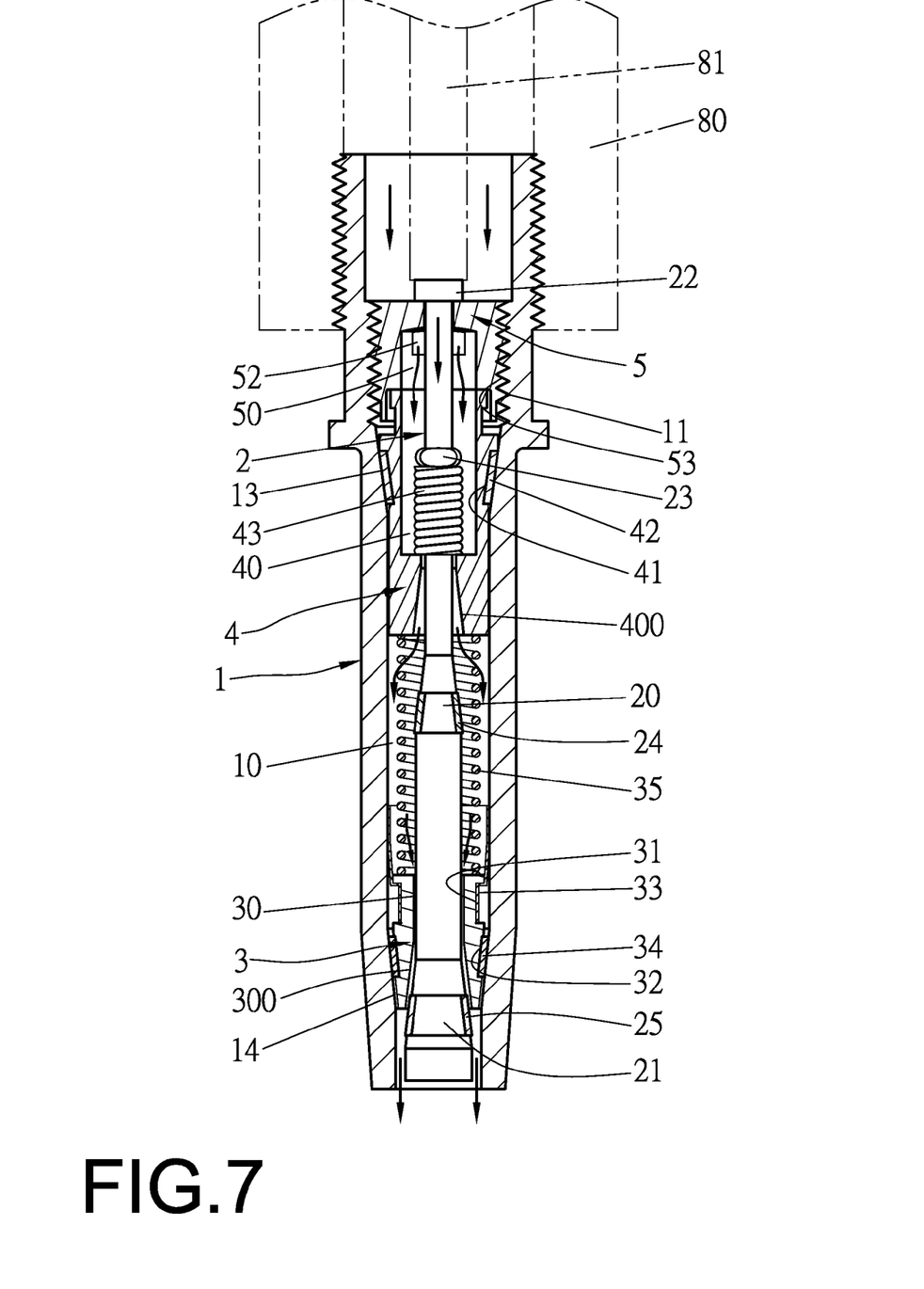
FIG. 7 is a cross-sectional view of the tire air valve having the function of indicating tire pressure in the present invention, illustrating an air intake condition when the tire is inflated.

To inflate a tire, referring to FIGS. 6 and 7, simply remove the cap 6 from the air valve casing 1 and then have an inflation adapter 80 of a common inflating apparatus (not shown) fitted with the air valve casing 1 to let the thimble 81 in the inflation adapter 80 push the center post 2 in the air valve casing 1 to move downward. In the meantime, the upper sealing ring 24 of the center post 2 will be disengaged from the obliquely-conical surface 400 in the stepped through hole 40 of the upper locking block 4, and the lower sealing ring 25 of the center post 2 will also disengage from the obliquely-conical surface 300 in the stepped through hole 30 of the lower locking block 3 to form a passage way, as shown in FIG. 7. Thus, air pumped by the inflating apparatus will be sent into the stepped accommodating chamber 10 of the air valve casing 1 through the inflation adapter 80 and then will get into the recessed groove 50 through the air intake 52 of the fixed member 5 and simultaneously, the air will enter the lower section of the stepped accommodating chamber 10 of the air valve casing 1 and then will get into the tire through the stepped through hole 30 of the lower locking block 3 to finish inflating the tire. After finishing inflation, the inflation adapter 80 shall be removed from the air valve casing 1, and the center post 2 will be pushed upward by the air pressure in the tire and by restored resilience of the second spring 43 and at this time, the upper sealing ring 24 of the center post 2 will seal up the stepped through hole 40 of the upper locking block 4, and the lower sealing ring 25 will seal up the stepped through hole 30 of the lower locking block 3. When pushed upward, the center post 2 will actuate the lower locking block 3 to move upward and recover its original position, letting the center post 2 and the upper locking block 4. and the lower locking block 3 become sealed, able to prevent air in the tire from leaking out. After the cap 6 is threadably fixed on the air valve casing 1, the push block 22 of the center post 2 in the air valve casing 1 will push the lower indicating member 65 in the cap 6 to move upward and push the third spring 64 to become elastically compressed once again to let the lower indicating member 65 fully cover the outer side of the upper indicating member 63. At this time the green-colored safety region 652 will be seen through the transparent viewing window 60 of the cap 6 to let a driver know that the tire pressure is in a normal condition.

Furthermore, the elasticity coefficient of the first spring 35 and the second spring 43 and the third spring 64 of this invention is preset in accordance with different-sized automobiles so that the pressure reaction in the tire of an automobile can be balanced with the thrust force of the first spring 35 and the second spring 43 and the third spring 64. By mutual matching of the specified resilience of the first spring 35, the second spring 43 and the third spring 64 with the pressure in a tire, the center post 2 can accurately be pushed to shift and actuate the lower indicating member 65 to move according to variation of the tire pressure of a tire. The displacement distance of the lower indicating member 65 in the cap 6 and the tire pressure in a tire are in direct proportion.

To sum up, whether the pressure of a tire is normal or not can be judged by means of visual observation through the cap 6 of a tire air valve. If green color (safety region 652) appears on the transparent viewing window 60 of the cap 6, it means that the tire pressure is normal, and if yellow color (low pressure region 631) appears, it means that the tire pressure is somewhat low, while appearance of red color (warning region 632) shows that the tire pressure is too low and the tire must be inflated right away. Thus, a driver can easily examine the tire pressure by himself, needless to additionally use a tire pressure detector, convenient in use and able to prevent air in a tire from leaking out for insuring driving safety.

While the preferred embodiment of the invention has been described above, it will be recognized and understood that various modifications may be made therein and the appended claims are intended to cover all such modifications that may fall within the spirit and scope of the invention.

What is claim is:

1. A tire air valve having the function of indicating tire pressure comprising:

an air valve casing formed with a stepped accommodating chamber in an interior, said stepped accommodating chamber having an inner wall provided with female threads, said air valve casing having an upper section of an outer wall provided with male threads, said stepped accommodating chamber having an upper section of an inner wall formed with an upper obliquely-conical surface and a lower section formed with a lower obliquely-conical surface;

a center post received in said stepped accommodating chamber of said air valve casing, said center post formed with an upper annular recess and a lower annular recess on an outer wall, said upper annular recess and said lower annular recess respectively being in an obliquely-conical shape, said center post having an upper end provided with a push block, said center post provided with a flange on a wall surface at a location between said upper annular recess and said push block, an upper sealing ring fitted on said upper annular recess and a lower sealing ring fitted on said lower annular recess of said center post, said upper sealing ring and said lower sealing ring being obliquely-conical shaped;

a lower locking block fixed around a lower section of said center post, said lower locking block provided with a stepped through hole, said stepped through hole having a lower section formed with an obliquely-conical surface for matching said lower sealing ring on said center post, said lower locking block having an outer wall disposed with an obliquely-conical annular recess, said annular recess fitted thereon with an obliquely-conical sealing ring matching said lower obliquely-conical surface of said air valve casing, a first spring fitted on said center post, said first spring having a lower end resting on an upper end of said lower locking block, an upper locking block mounted around an intermediate section of said center post, said upper locking block having a lower end pushing against an upper end of said first spring, said upper locking block formed with a stepped through hole, said stepped through hole having a lower section provided with an obliquely-conical surface matching with said upper sealing ring on said center post, said upper locking block having an outer wall disposed with an obliquely-conical annular recess, said annular recess fitted thereon with an obliquely-conical sealing ring that matches said upper obliquely-conical surface of said air valve casing, a second spring fitted around said center post, said second spring having a lower end positioned in said stepped through hole of said upper locking block, said second spring having the lower end resting on said upper locking block, said second spring having an upper end pushing against said flange of said center post;

a fixed member received in said stepped accommodating chamber of said air valve casing, said fixed member having an underside formed with a recessed groove, said fixed member having a topside bored with an insert hole passing through said recessed groove, said fixed member provided with an air intake accommodating with said recessed groove, said fixed member having an outer wall provided with male threads to be threadably locked with said female threads in said stepped accommodating chamber of said air valve casing;

a cap assembled on said air valve casing, said cap made of transparent material, said cap having an upper portion formed into a transparent viewing window, said cap formed with an accommodating chamber in an interior, said accommodating chamber having an inner wall provided with female threads to be threadably locked with said male threads of said air valve casing, said accommodating chamber installed therein with an upper indicating member, a third spring and a lower indicating member, said upper indicating member formed with a recessed groove for receiving said third spring therein, said third spring having an upper end resisting against an inner side of said recessed groove, said upper indicating member having an upper portion of an outer wall formed into a low pressure region, said upper indicating member having a lower portion of an outer wall formed into a warning region, said lower indicating member mounted on outer side of said upper indicating member, said lower indicating member provided with a recessed hollow for receiving both said upper indicating member and said third spring therein, said third spring having a lower end resting on an inner side of said recessed hollow, said lower indicating member having an upper edge provided with a flange, said lower indicating member having an outer wall formed into a safety region, said lower indicating member having an underside pushing against said push block of said center post; and a locking ring installed in said accommodating chamber of said cap, said locking ring bored with a through hole for said lower indicating member to be inserted therethrough, said locking ring provided with male threads to be threadably locked with said female threads of said cap.

2. A tire air valve having the function of indicating tire pressure as claimed in claim 1, wherein said lower locking block has an outer wall provided with an engage recess having a buffer washer fitted thereon.

3. A tire air valve having the function of indicating tire pressure as claimed in claim 1, wherein said low pressure region of said upper indicating member is marked with yellow color, said warning region marked with red color and said safety region marked with green color.

* * * * *